(12) United States Patent
Liu et al.

(10) Patent No.: US 10,749,459 B1
(45) Date of Patent: Aug. 18, 2020

(54) SOLAR PANEL TOP CLAMP ASSEMBLY FOR ROOFS AND THE LIKE

(71) Applicant: Sunmodo Corporation, Vancouver, WA (US)

(72) Inventors: Jun Liu, Camas, WA (US); Roland Jasmin, Portland, OR (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 16/408,465

(22) Filed: May 10, 2019

(51) Int. Cl.
| | |
|---|---|
| *H02S 20/23* | (2014.01) |
| *H02S 30/00* | (2014.01) |
| *H02S 40/34* | (2014.01) |
| *F16B 5/06* | (2006.01) |
| *F16B 2/12* | (2006.01) |

(52) U.S. Cl.
CPC ............... *H02S 20/23* (2014.12); *F16B 2/12* (2013.01); *F16B 5/065* (2013.01); *F16B 5/0635* (2013.01); *F16B 5/0685* (2013.01); *H02S 30/00* (2013.01); *H02S 40/34* (2014.12)

(58) Field of Classification Search
CPC .......... H02S 20/23; H02S 40/34; H02S 30/00; F16B 2/12; F16B 5/0685; F16B 5/065; F16B 5/0635
See application file for complete search history.

(56) References Cited

U.S. PATENT DOCUMENTS

| | | | |
|---|---|---|---|
| 8,181,926 B2 * | 5/2012 | Magno, Jr. ............ | F24S 25/636 248/237 |
| 9,097,443 B2 | 8/2015 | Liu et al. | |
| 9,175,878 B2 | 11/2015 | Kemmer et al. | |
| 9,175,879 B2 | 11/2015 | Habdank et al. | |

(Continued)

FOREIGN PATENT DOCUMENTS

| | | |
|---|---|---|
| CN | 202049989 U | 11/2011 |
| CN | 102312886 A | 1/2012 |

(Continued)

OTHER PUBLICATIONS

Universal clamp One-Mid and One-End compatible, May 29, 2017, K2 Systems GmbH, Renningen, Germany, downloaded from the Internet at: https://k2-systems.com/en/news/details/universal-clamp-one-mid-and-one-end-compatible-with-eight-systems on Feb. 8, 2019.

(Continued)

*Primary Examiner* — Babajide A Demuren
(74) *Attorney, Agent, or Firm* — Stone Creek Services LLC; Alan M Flum

(57) ABSTRACT

Disclosed is a solar panel top clamp assembly for securing solar panels to a support section such as a rail or rail-less mounting structure. The solar panel top clamp assembly includes a panel clamp and a base. The panel clamp includes a crossbar and a pair of legs projecting obliquely downward from the crossbar and angled inward toward one another. The panel clamp is secured to a pedestal that projects upward from a platform. The platform is captively slidable (Continued)

within the support section. The pedestal and platform together form a portion of the base. Thanks in part to the unique structure of the panel clamp, the solar panel top clamp assembly can perform the function of both an end-clamp and a mid-clamp.

13 Claims, 16 Drawing Sheets

(56) References Cited

U.S. PATENT DOCUMENTS

| | | | |
|---|---|---|---|
| 9,803,893 B2 | 10/2017 | Giraudo et al. | |
| 9,876,463 B2 | 1/2018 | Jasmin | |
| 9,985,575 B2 * | 5/2018 | Stearns | F24S 25/60 |
| 2011/0138585 A1 * | 6/2011 | Kmita | H02S 20/00 |
| | | | 24/522 |
| 2013/0011187 A1 * | 1/2013 | Schuit | F16B 2/065 |
| | | | 403/287 |
| 2015/0102194 A1 | 4/2015 | Liu | |
| 2016/0111997 A1 * | 4/2016 | Ganshaw | H02S 20/23 |
| | | | 248/224.7 |

FOREIGN PATENT DOCUMENTS

| | | | |
|---|---|---|---|
| CN | 202285239 U | 6/2012 | |
| CN | 205566169 U | 9/2016 | |
| CN | 205566197 U | 9/2016 | |
| DE | 202014102469 U1 | 9/2014 | |
| DE | 202014102470 U1 | 9/2014 | |
| DE | 102015117537 B3 | 12/2016 | |
| EP | 1930668 A2 * | 6/2008 | ............ F24S 25/61 |
| EP | 2410190 B1 | 7/2015 | |
| JP | 3550950 B2 | 8/2004 | |
| KR | 101700678 B1 | 2/2017 | |
| WO | 03098126 A1 | 11/2003 | |

OTHER PUBLICATIONS

Aluminum Solar Panel Clamp/PV Parts/Solar PV Module Clamps, Shen Tai Steel Structure Accessory Factory, downloaded from the Internet from https://www.alibaba.com/product-detail/aluminum-solar-panel-clamp-PV-parts_1292802395.html on Feb. 9, 2019.

* cited by examiner

SOLAR PANEL TOP CLAMP ASSEMBLY FOR ROOFS AND THE LIKE

BACKGROUND

This disclosure relates to devices for mounting solar panels to mounting structures, such as roofs, using over-the-panel clamping devices.

Solar panels, such as solar photovoltaic panels, can mount to various types of mounting structures. These mounting structures can include roofs, for example, pitched shingle roofs, tile roofs, metal roofs, or concrete roofs. Solar panels often mount together in rows and columns known as solar panel arrays. Solar panels and solar panel arrays are commonly secured to mounting rails that span the length of one or more solar panels. Mounting brackets typically secure the mounting rails to the roof structure. Solar panels can also be mounted to roofs or other mounting structures without rails. These so-called rail-less mounting devices do not span the length of the solar panel. Instead, they are typically mounted under each corner of the solar panel or between two panels mounted side-by-side in a solar panel array.

Over-the-panel clamp assemblies, also known as top clamp assemblies, can secure the solar panels to the rail or the rail-less mounting devices. Top clamp assemblies clamp the top of the solar panel frame to a rail or a rail-less mounting device by clamping the top of the solar panel frame against the mounting devices. Over-the-panel clamp assemblies include mid-clamp assemblies and end-clamp assemblies. Mid-clamp assemblies, mount between two solar panels within a solar panel array. End-clamp assemblies mount at an outside perimeter or end of an array of solar panels.

Solar panel installers and solar panel mounting device manufacturers seek to simplify installation and minimize system costs. One challenge they face is that solar panel frames are not all standardized around a single height. The height can vary from manufacturer to manufacturer. For example, solar panel heights often range from 30 mm (1.18 inches) to 50 mm (1.97 inches). Some solar panel mounting device manufacturers offer a range of end-clamp assemblies and a range of mid-clamp assemblies, each with different heights to accommodate a corresponding range of solar panel frame heights. Other solar panel mounting device manufacturers offer height-adjustable end-clamp assemblies or height-adjustable mid-clamp assemblies to accommodate a range of solar panel heights.

SUMMARY

The inventors set out to create an over-the-panel clamp assembly that could function as both a mid-clamp and an end-clamp that secures one or more solar panels to a support section. A support section is typically a rail or a rail-less mounting device. In addition, the inventors wanted their over-the-panel clamp assembly to be height-adjustable (i.e., accommodate a range of solar panel heights). The inventor observed that typical height-adjustable mid-clamps clamp straight downward while height-adjustable end-clamps rotate or pivot about the clamping surface and away from the solar panel as the end-clamp is tightened. This rotation causes instability when attempting to use typical mid-clamps as end-clamps. The inventors discovered that rather than viewing this rotation of the clamp as a disadvantage or problem, they could create a novel solar panel top clamp assembly that utilizes this rotational force and allows the solar panel top clamp assembly to function as both a mid-clamp and end-clamp.

The inventors developed a solar panel top clamp assembly that includes a panel clamp with a pair of legs extending obliquely downward and inward from a crossbar. The crossbar being a top portion of the panel clamp. The panel clamp is secured to the pedestal of a base by a threaded fastener. The base includes the pedestal and a platform. The pedestal extends up from a platform, the platform is sized and shaped to captively slide within a slot that extends lengthwise along the top of the support section.

When used as an end-clamp, as the threaded fastener tightens, the crossbar engages the top of the solar panel frame and clamps the solar panel against the support section. The crossbar will rotate or pivot away from the solar panel about the point of contact between the panel clamp and the solar panel frame. As this occurs, the leg farthest from the solar panel will engage and press against the pedestal. This will create two points of support for the panel clamp. The first point of support being the clamping surface between the crossbar and the solar panel frame. The second point of support being the point of contact between the pedestal and the end of the leg. In order to enhance the contact force between the pedestal and the end of the leg, the end of the leg can terminate in a sharpened surface. The sharpened surface is formed by the vertex of the inside surface of the leg and the bottom end surface of the leg. In addition, the pedestal can taper inwards. That is, the surfaces of the pedestal that face the legs, can be tapered inward from the platform on up.

When used as a mid-clamp, the solar panel top panel assembly can clamp and secure two solar panels to the support section. As the threaded fastener is tightened, the panel clamp engages the top of each of the solar panel frames and clamps them to the support section. Any tendency for the panel clamp to rotate away from one solar panel is counterbalanced by the tendency to rotate away from the other. This causes the legs panel clamp to move approximately evenly downward over the outside of the pedestal. As the threaded fastener threadedly engages the pedestal and is tightened, the solar panel frame of each solar panel presses against the lengthwise top surface of the support section, the panel clamp presses against the solar panel frame, and the platform presses against the top inside surface of the slot. As the platform presses against the top inside surface of the slot, it stabilizes the base and helps it remain rigid with respect to the support section, the solar panels, and the threaded fastener.

In order to help stabilize the solar panel top clamp assembly, the platform can extend lengthwise (i.e., longitudinally) in both directions along the slot away from the pedestal. In addition, the bottom of the pedestal can extend across (i.e. transversely) the lengthwise top surfaces on both sides of the slot. The lengthwise extension of the platform also allows for the use of grounding pins. Indents between the overhang of the pedestal and the platform allow the base to slide along the slot. Making the indents approximately the thickness of the support section at the opening of the slot adds further stability to the base and the solar panel top clamp assembly.

This Summary introduces a selection of concepts in simplified form that are described the Description. The Summary is not intended to identify essential features or limit the scope of the claimed subject matter.

DRAWINGS

DESCRIPTION

The terms "left," "right," "top, "bottom," "upper," "lower," "front," "back," and "side," are relative terms used throughout the Description to help the reader understand the figures. In reference to the solar panel top clamp assembly, as used throughout this disclosure, "front" refers to the portion of the clamp facing away from the solar panel and away from the mounting rail. Likewise, "rear," refers to the portion of the solar panel top clamp assembly that faces into or toward the mounting rail and toward the solar panel. Specific dimensions are intended to help the reader understand the scale and advantage of the disclosed material. Dimensions given are typical and the claimed invention is not limited to the recited dimensions. The use of ordinals such as first, second, or third are used as a naming convention. They do not denote that one feature, embodiment, or structure is superior or inferior to another.

Figure 1:
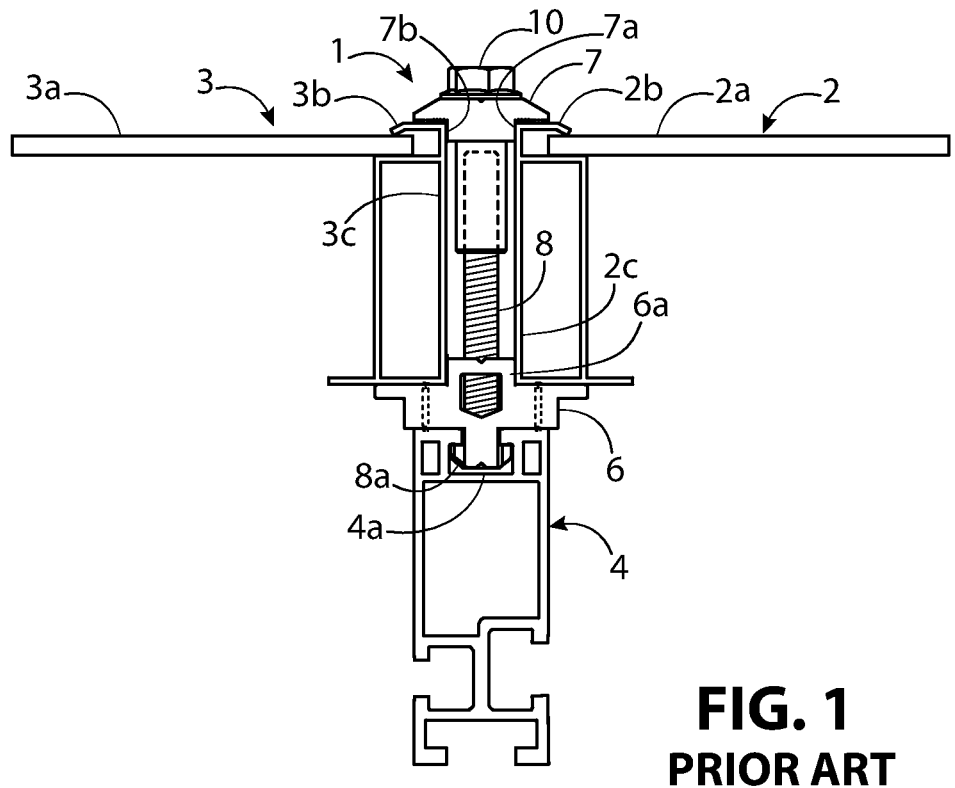
FIG. 1 illustrates a mid-clamp assembly in the prior art, securing two solar panels to a rail.
Figure 2:
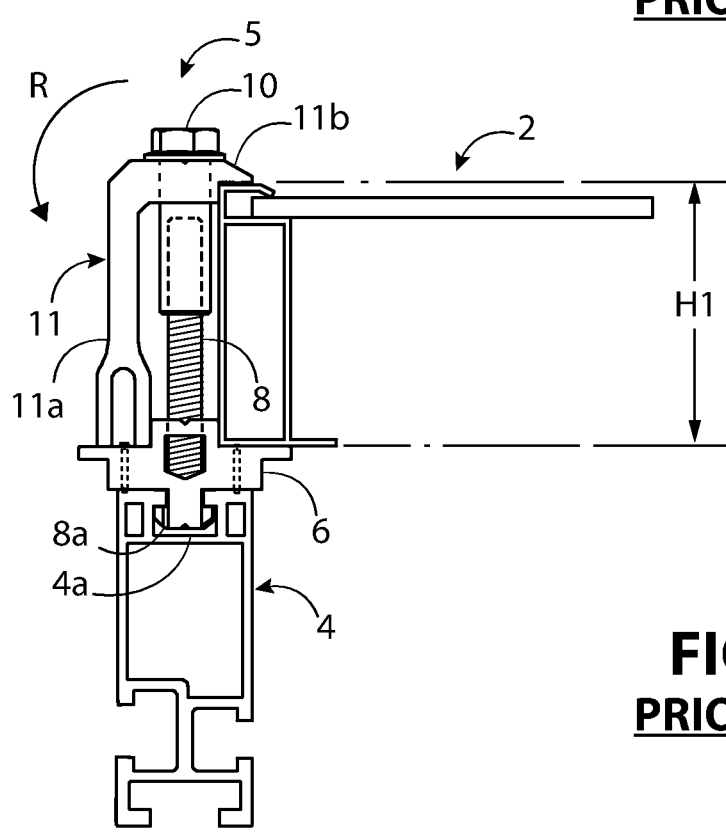
FIG. 2 illustrates an end-clamp assembly in the prior art, securing a solar panel to the rail.

As discussed in the Background, solar panel over-the-panel clamps, or solar panel top clamps, typically come either as mid-clamp assemblies or end-clamp assemblies. FIG. 1 illustrates a mid-clamp assembly 1 in the prior art, securing the solar panels 2, 3 to a rail 4. FIG. 2 illustrates an end-clamp assembly 5 in the prior art, securing the solar panel 2 to the rail 4. FIGS. 1 and 2 are similar to the mid-clamp assembly 1 and end-clamp assembly 5 discussed and illustrated in U.S. Pat. No. 9,097,443 (Liu et al.). In the example of FIG. 1, the mid-clamp assembly 1 includes a base 6, mid-clamp 7, a t-bolt 8, and a shoulder bolt 10. Tightening the shoulder bolt 10, presses the t-bolt head 8a against a rail slot 4a, the base 6 against the rail 4, pushes the mid-clamp 7 against the top of the solar panels 2, 3 and pushes the solar panels 2, 3 against the base 6. The t-bolt 8 and shoulder bolt 10 pull the mid-clamp 7 downward along an axis approximately perpendicular to the solar panel top surfaces 2a, 3a. This creates approximately equal pressure on the solar panel frames 2b, 3b. The side portions 7a, 7b of the mid-clamp 7 are parallel to solar panel frame sides 2c, 3c, respectively. A guide portion 6a projecting upward from the base 6 also includes sides that are parallel to the solar panel frame sides 2c, 3c (i.e., perpendicular to the top surface of the base 6). The side portions 7a, 7b along with a guide portion 6a prevent the solar panels 2, 3 and the mid-clamp 7 from rotating in the plane of the solar panel top surfaces 2a, 3a (i.e., a plane parallel to the rotational axis of the shoulder bolt 10) as the shoulder bolt 10 is tightened.

Referring to FIG. 2, the end-clamp assembly 5 also is illustrated with a base 6, a t-bolt 8, and a shoulder bolt 10. Instead the mid-clamp 7 of FIG. 1, the end-clamp assembly 5 includes an end-clamp 11. The end-clamp 11 includes a clamp leg 11a projecting approximately perpendicularly down from an upper clamping portion 11b. Tightening the shoulder bolt 10, presses the t-bolt head 8a against a rail slot 4a, the base 6 against the rail 4, pushes the end-clamp 11 against the top of the solar panel 2, and pushes the solar panel 2 against the base 6. As the shoulder bolt 10 is tightened, the end-clamp 11 will tend to rotate away from the solar panel 2. This is shown by the arc R. The clamp leg 11a is used in place of the solar panel 3 from FIG. 1 to prevent the end-clamp 11 from rotating and to create a secure support for the solar panel 2. Rotation along arc R is prevented as the clamp leg 11a planarly engages the top of the base 6 and planarly engages the guide portion 6a. This arrangement requires that the height of the end-clamp 11 is fixed to accommodate a particular solar panel height H1.

The inventors set out to create an over-the-panel clamp assembly that could function as both a mid-clamp and an end-clamp. In addition, the inventors wanted their over-the-panel clamp assembly to be height-adjustable (i.e., accommodate a range of solar panel heights). The inventors discovered that rather than viewing the rotation of the clamp away from the solar panel (for example, arc R in FIG. 2) as a disadvantage or problem, they could create a novel over-the-panel clamp assembly that utilizes this rotational force and allows the over-the-panel clamp assembly to function as both a mid-clamp and end-clamp.

Figure 3:
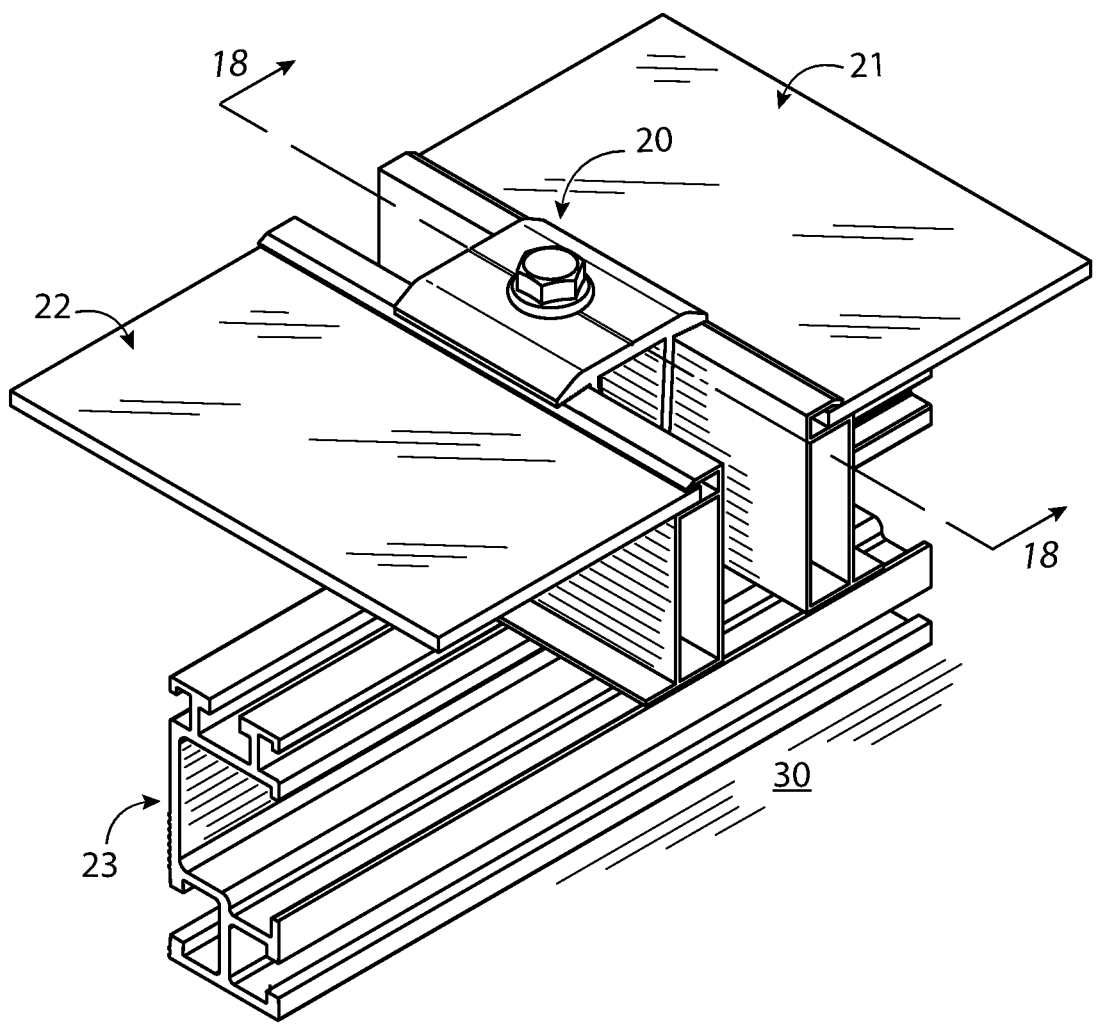
FIG. 3 illustrates the solar panel top clamp assembly of the present disclosure, securing two solar panels to a support section, such as a rail or a rail-less mounting structure, in a top and perspective view, with the front surface of the solar panel removed for clarity.
Figure 4:
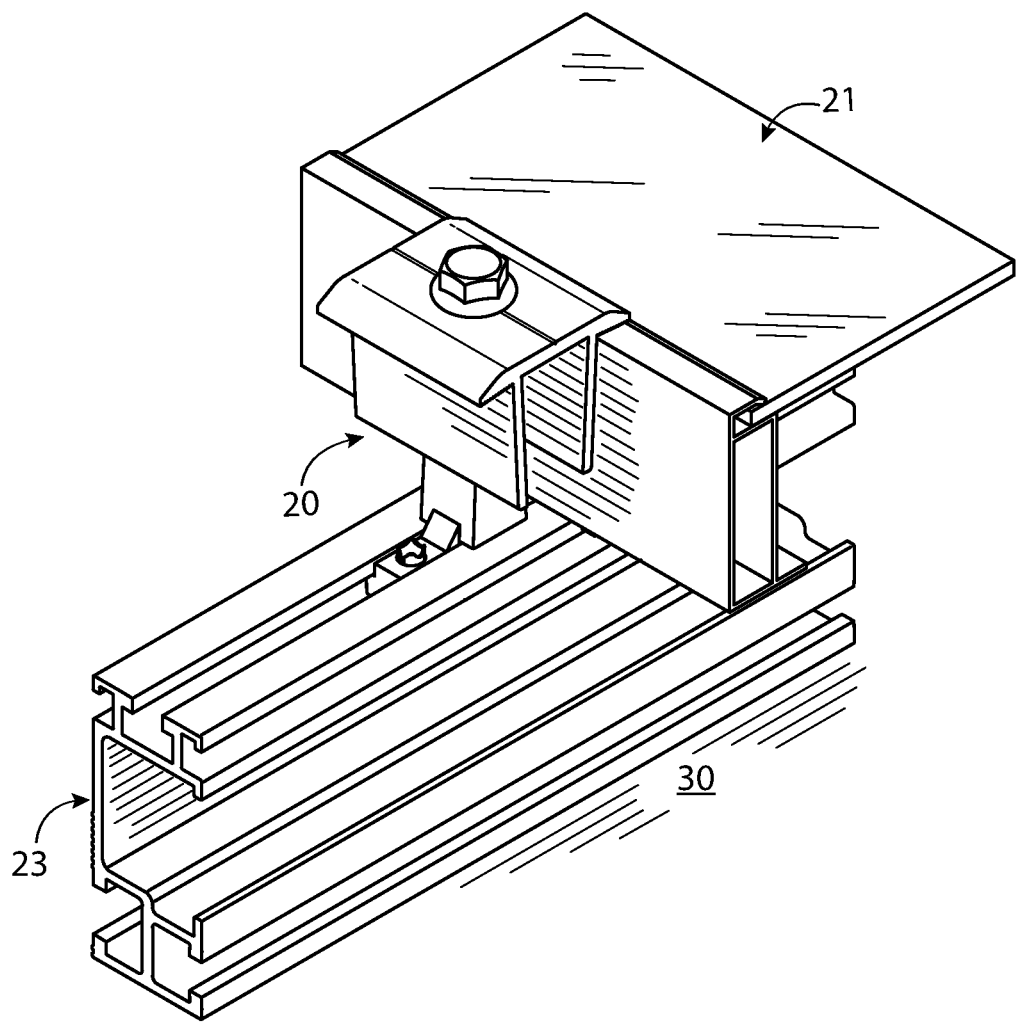
FIG. 4 illustrates the solar panel top clamp assembly securing a solar panel to the support section, in a top and perspective view, with the front surface of the solar panel removed for clarity.

FIGS. 3 and 4, illustrate the solar panel top clamp assembly 20 developed by the inventor that can function as a mid-clamp (FIG. 3) or an end-clamp (FIG. 4) by utilizing the rotational force discussed in the previous paragraph. In FIG. 3, the solar panel top clamp assembly 20 is positioned between a solar panel 21 and a solar panel 22 and secures both the solar panel 21 and the solar panel 22 to the support section 23. In FIG. 4, the solar panel top clamp assembly 20 secures only the solar panel 21 to the support section 23.

Figure 5:
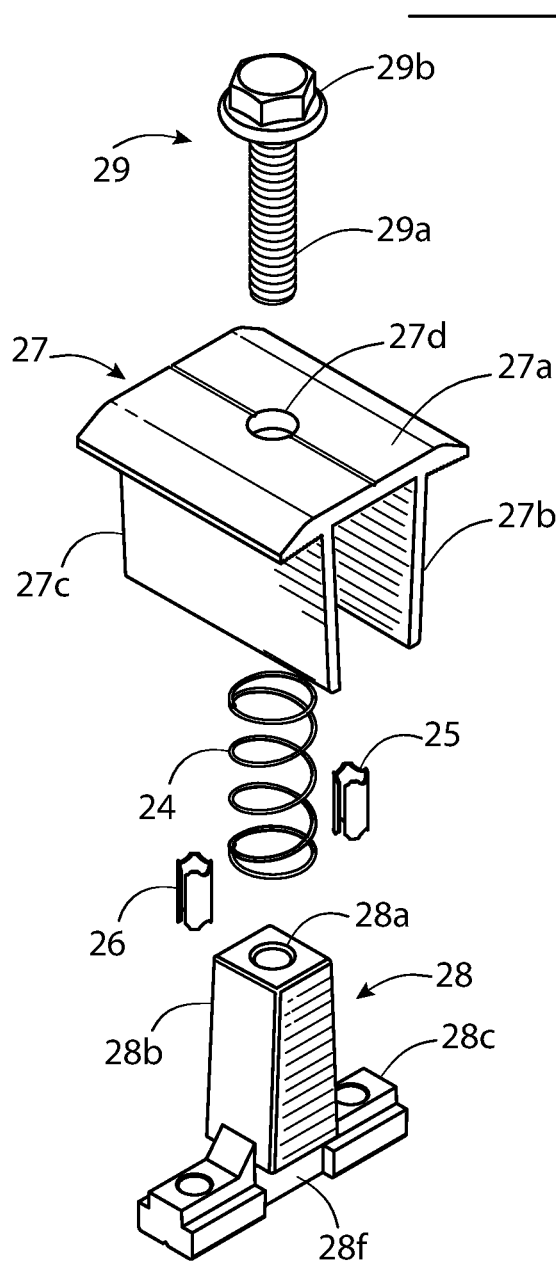
FIG. 5 illustrates an exploded perspective view of the solar panel top clamp assembly of FIG. 3.
Figure 6:
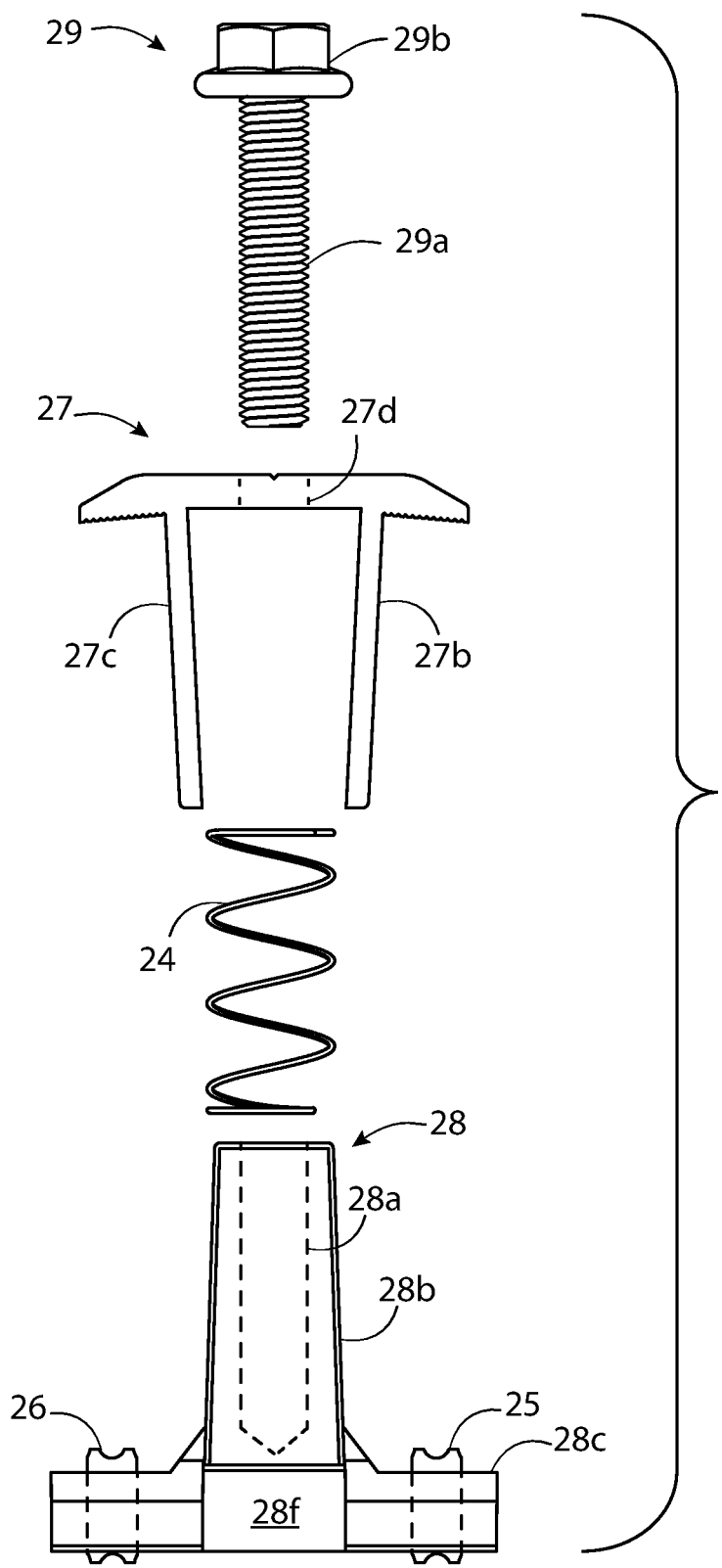
FIG. 6 illustrates an exploded front view of the solar panel top clamp assembly of FIG. 3.

Referring to FIGS. 5 and 6, the solar panel top clamp assembly 20 can include a spring 24, grounding pins 25, 26, a panel clamp 27, a base 28, and a threaded fastener 29. The panel clamp 27 includes a crossbar 27a forming a top portion of the panel clamp 27, and a first leg 27b and a second leg 27c. The first leg 27b, and the second leg 27c, each extend obliquely downward from the crossbar 27a and inward toward each other. The threaded fastener body 29a passes through an aperture 27d in the crossbar 27a, through the spring 24, and threadedly engages a threaded aperture 28a in a pedestal 28b extending upward from a platform 28c of the base 28. The threaded fastener head 29b seats against the top of the crossbar 27a.

The panel clamp 27 can be pi-shaped with the crossbar 27a forming the top of the pi-shape, and the first leg 27b and the second leg 27c forming the descenders of the pi-shape. This shape has the following advantages. First, a panel clamp 27 with a pi-shape can provide added strength and stability. The pi-shape allows the panel clamp 27 to have two points of support when used as an end-clamp. One point of support being the solar panel frame top surface. The rotational force described above will cause the panel clamp 27 to pivot about the first point of support and engage the pedestal 28b, creating a second point of support. Second, the pi-shape of the panel clamp 27 is less likely to interfere with the side of the solar panel frame when used as an end clamp. As the panel clamp 27 pivots away from the solar panel, the panel 27 is less likely to collide with the solar panel frame side surface thanks to the oblique angle of the second leg 27c. Third, the pi-shape potentially allows the panel clamp 27 to be narrower than shapes where the crossbar is detented between the legs. Those shapes must have sufficient width to accommodate a tool, such as a wrench, nut driver, or socket wrench, to access the threaded fastener 29. A pi-shape does not have this limitation. Fourth, a pi-shape allows the greater range of travel and adjustment then some other top clamp styles because the crossbar 27a forms the top portion of the panel clamp 27. This allows the solar panel top clamp assembly 20 to accommodate a wider range of solar panel thicknesses.

Figure 7:
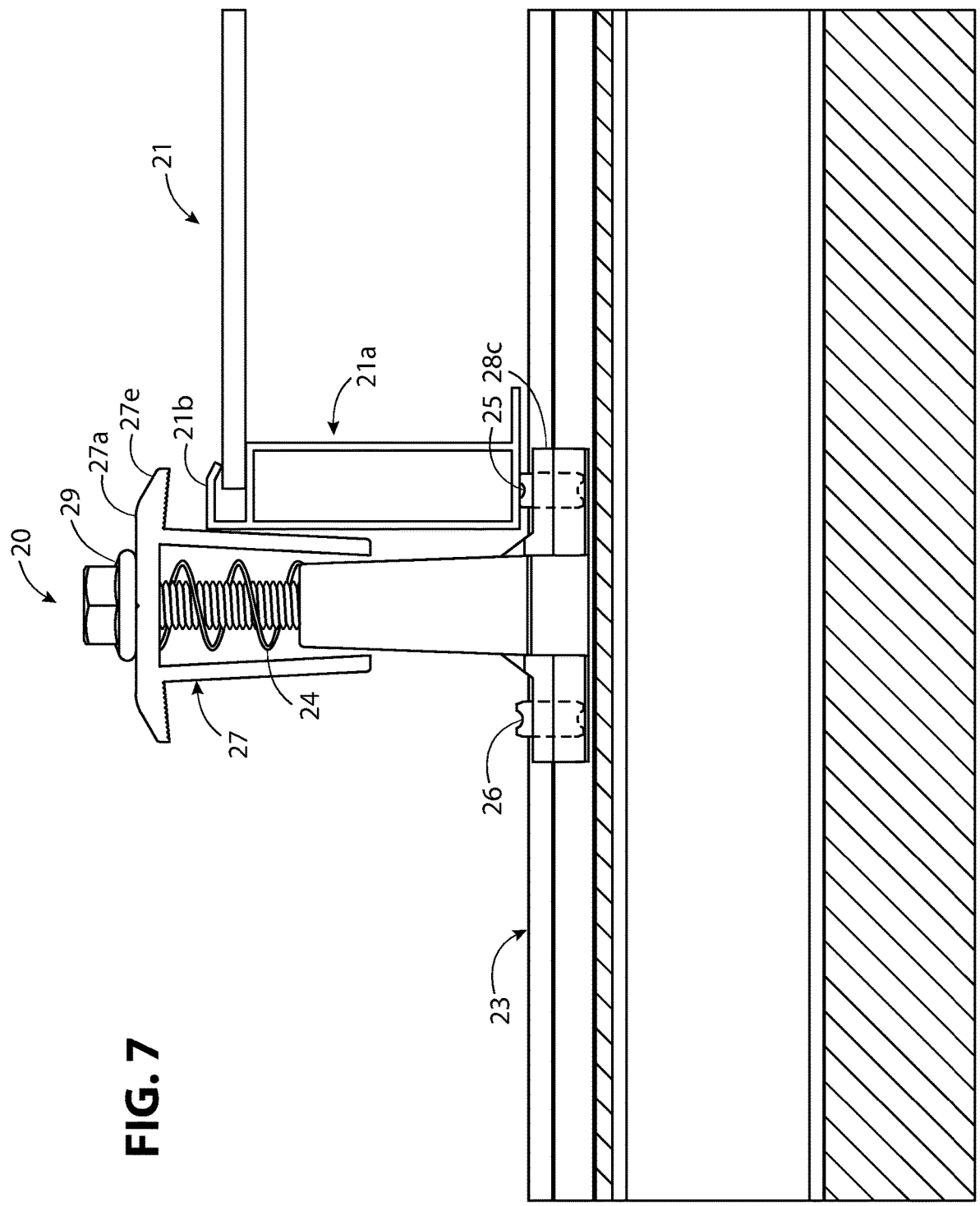
FIG. 7 illustrates a front elevation view of FIG. 4 with the support structure cut away to show how the base interacts with a slot disposed lengthwise along the top of the support section.
Figure 8:
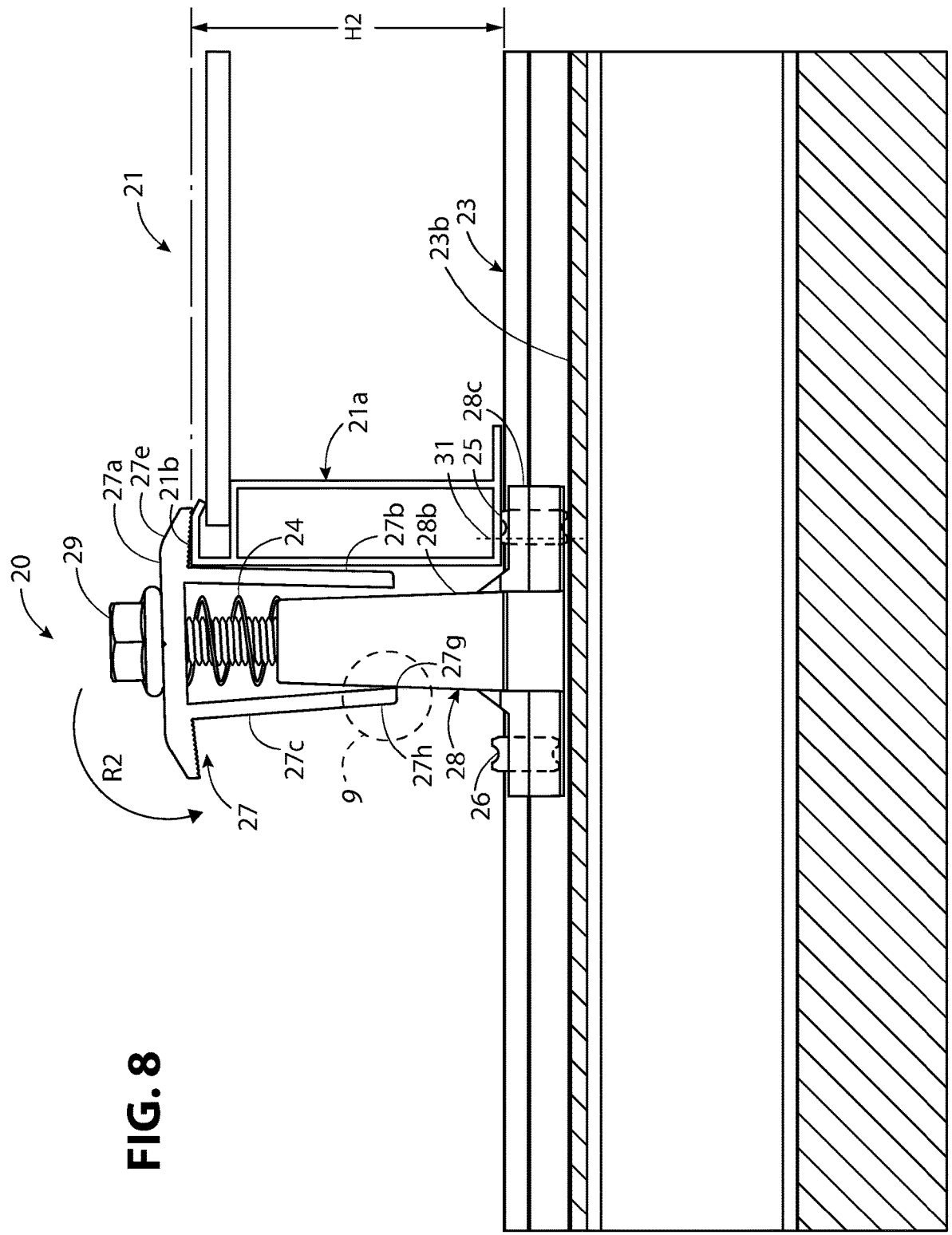
FIG. 8 illustrates a front elevation view as in FIG. 7, with the solar panel top clamp assembly tightened against the solar panel.

Referring to FIGS. 7 and 8, tightening the threaded fastener 29 in FIG. 7 causes the spring 24 to compress and a first flange portion 27e of the crossbar 27a to engage the top surface 21b of the solar panel frame 21a. The first flange portion 27e being a portion of the crossbar 27a that extends beyond the first leg 27b. The grounding pins 25, 26 in FIG. 7 are shown in a resting position partially extending above the top surface of the platform 28c. Referring to FIG. 8, grounding pin 26 remains in the resting position. Grounding pin 25 is pressed against the solar panel frame 21a and presses partially through the bottom of the platform 28c to engage the slot bottom surface 23b. This creates an electrical grounding path 31 between the solar panel 21, the support section 23, and the solar panel top clamp assembly 20.

The oblique downward and inward extending of the first leg 27b and the second leg 27c from the crossbar 27a utilize the rotational force discussed above to create two points of stable contact when the solar panel top clamp assembly 20 is used as an end-clamp. The panel clamp 27 makes one point of support with the top surface 21b of the solar panel frame 21a, and a second point of support with the pedestal 28b of the base 28. As the threaded fastener 29 is tightened, the panel clamp 27 pivots away from the solar panel 21 about the point of contact between the first flange portion 27e and the top surface 21b. This is represented by arc R2.

A second sharp vertex edge 27g of a second end portion 27h, of a second leg 27c, engages the pedestal 28b of the base 28.

Figure 9:
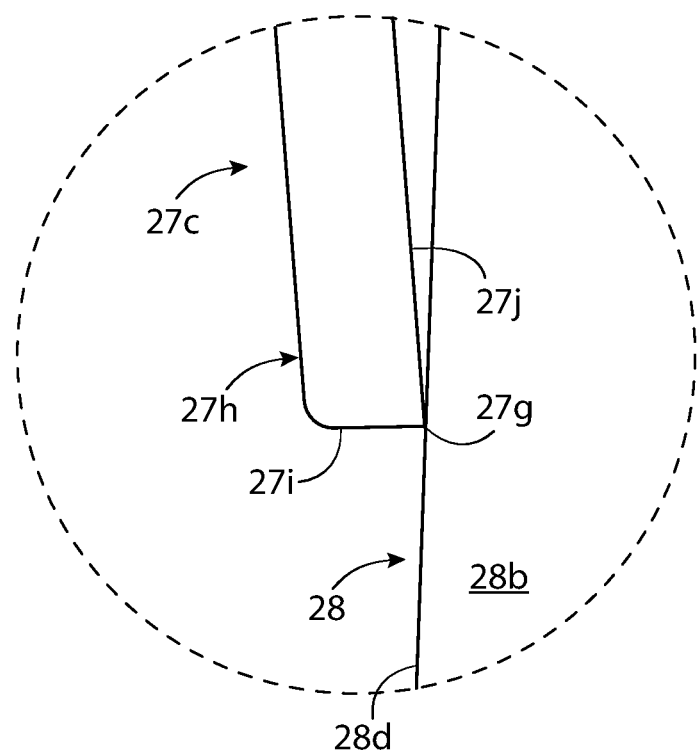
FIG. 9 illustrates a magnified view of a portion of FIG. 8 where the panel clamp intersects the pedestal.

Referring to FIG. 9, the second end portion 27h includes a second bottom face 27i and the second inside face 27j. The second sharp vertex edge 27g is formed from the intersection between the second bottom face 27i and the second inside face 27j. The second sharp vertex edge 27g presses against the pedestal 28b of the base 28. The second sharp vertex edge 27g intersects the pedestal 28b at an oblique angle (i.e., the planes of both the second bottom face 27i and the second inside face 27j are oblique with the plane of the second pedestal face 28d). This allows the second sharp vertex edge 27g to grip the second pedestal face 28d.

Figure 10:
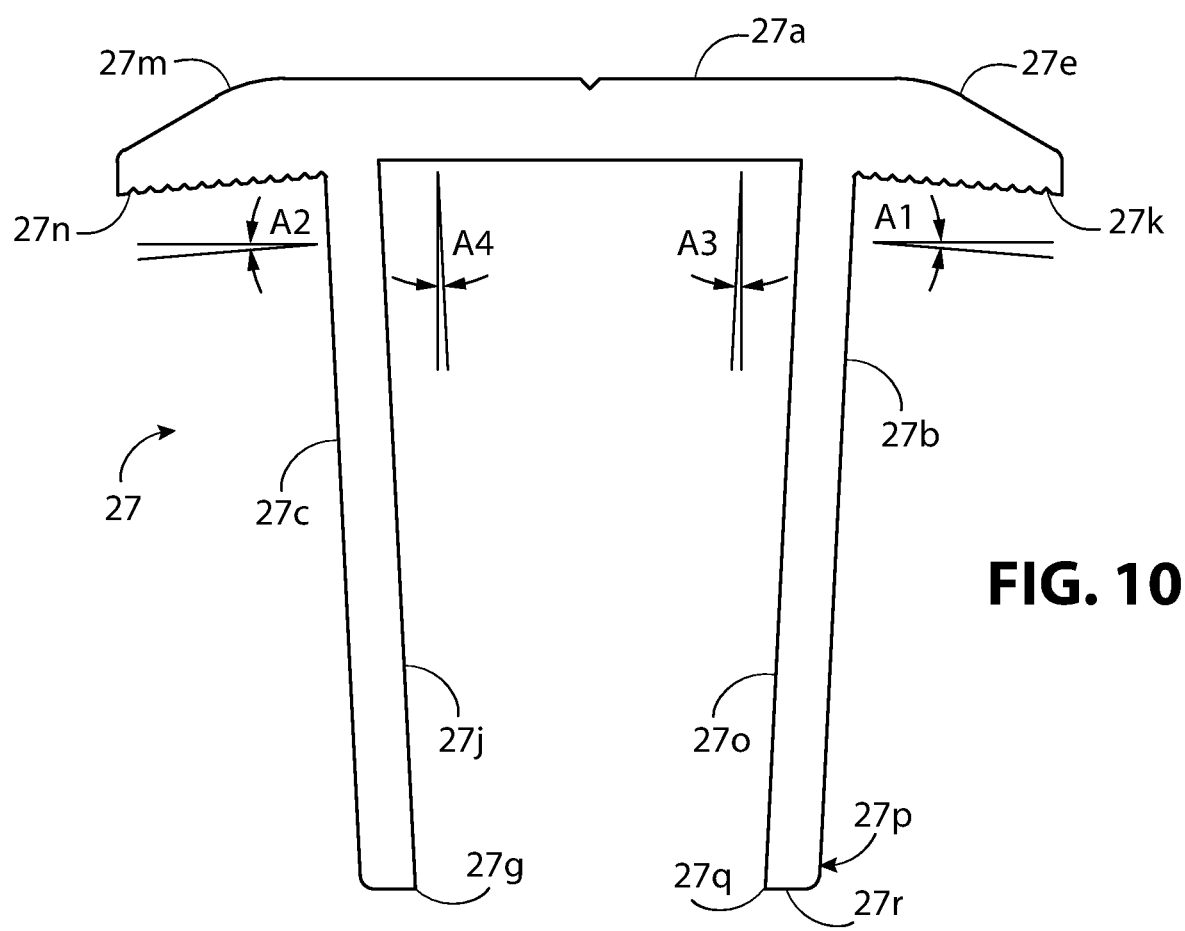
FIG. 10 illustrates the panel clamp in front elevation view.

Referring to FIG. 10, the first flange portion 27e includes a first flange portion bottom surface 27k that is angled downward by an angle A1. In addition, the first flange portion bottom surface 27k is serrated. Referring to FIG. 8, this combination allows the first flange portion 27e to better grip the top surface 21b of the solar panel 21. Referring to FIG. 10, similarly, the crossbar 27a includes a second flange portion 27m extending away from the crossbar 27a and the second leg 27c. The second flange portion 27m includes a second flange portion bottom surface 27n that is angled downward by an angle A2. Angle A1 and Angle A2 are typically equal. They typically range from 1° to 3°. While these ranges are typical, other angle ranges are possible depending on the construction of the panel clamp 27. As with the first flange portion bottom surface 27k, the second flange portion bottom surface 27n can be serrated as illustrated.

The solar panel top clamp assembly 20 has the following advantages. First, the solar panel top clamp assembly 20 can function as both a height-adjustable end-clamp and a height-adjustable mid-clamp. Second, when functioning as an end-clamp, it creates as least two points of support like stand-alone end-clamps. For example, in FIG. 8, the panel clamp 27 makes one point of support with the top surface 21b of the solar panel frame 21a, and a second point of support with the pedestal 28b of the base 28. The oblique and inward facing angle of the first leg 27b and the second leg 27c in FIG. 10, in combination with the inward sloped sides of the pedestal 28b of FIG. 11, help make this possible. Referring to FIG. 10, the oblique and inward facing angles of the first leg 27b and the second leg 27c are represented by angle A3 and angle A4, respectively. Angle A3 represents the angle between the plane perpendicular to the crossbar 27a and the first inside face 27o of the first leg 27b. Angle A4 represents the angle between the plane perpendicular to the crossbar 27a and the second inside face 27j. Angle A3 and angle A4 typically range from 1° to 4° and are typically equal. The inventor envisions that angle A3 and angle A4 can be greater than 4° with modification of the pedestal 28b (FIG. 11) to accommodate the greater angle.

Figure 11:
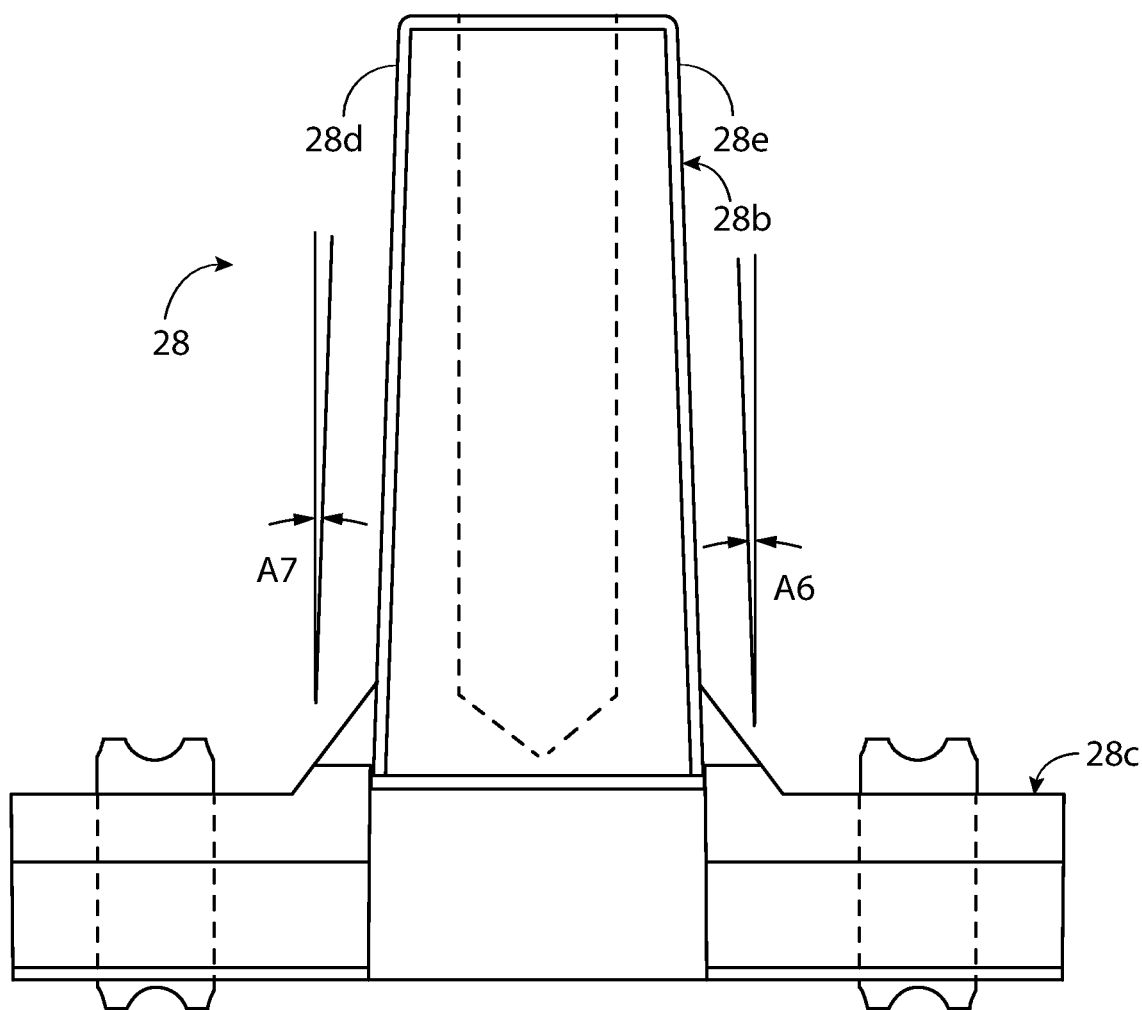
FIG. 11 illustrates the base of the solar panel top clamp assembly in front elevation view.

Referring to FIG. 11, the pedestal 28b of the base 28 can optionally include sides that slope inward. Angle A6 represents the inward sloping angle of the first pedestal face 28e with respect to the plane that is perpendicular to the lengthwise plane of the platform 28c. Angle A7 represents the inward sloping angle of the second pedestal face 28d with respect to the plane perpendicular to the lengthwise plane of the platform 28c. Angle A6 and angle A7 typically range from 1° to 3.° While this angle range is adequate for many applications, the angle can be modified to greater than 3° depending on the construction of the panel clamp 27 of FIG. 10.

Figure 12:
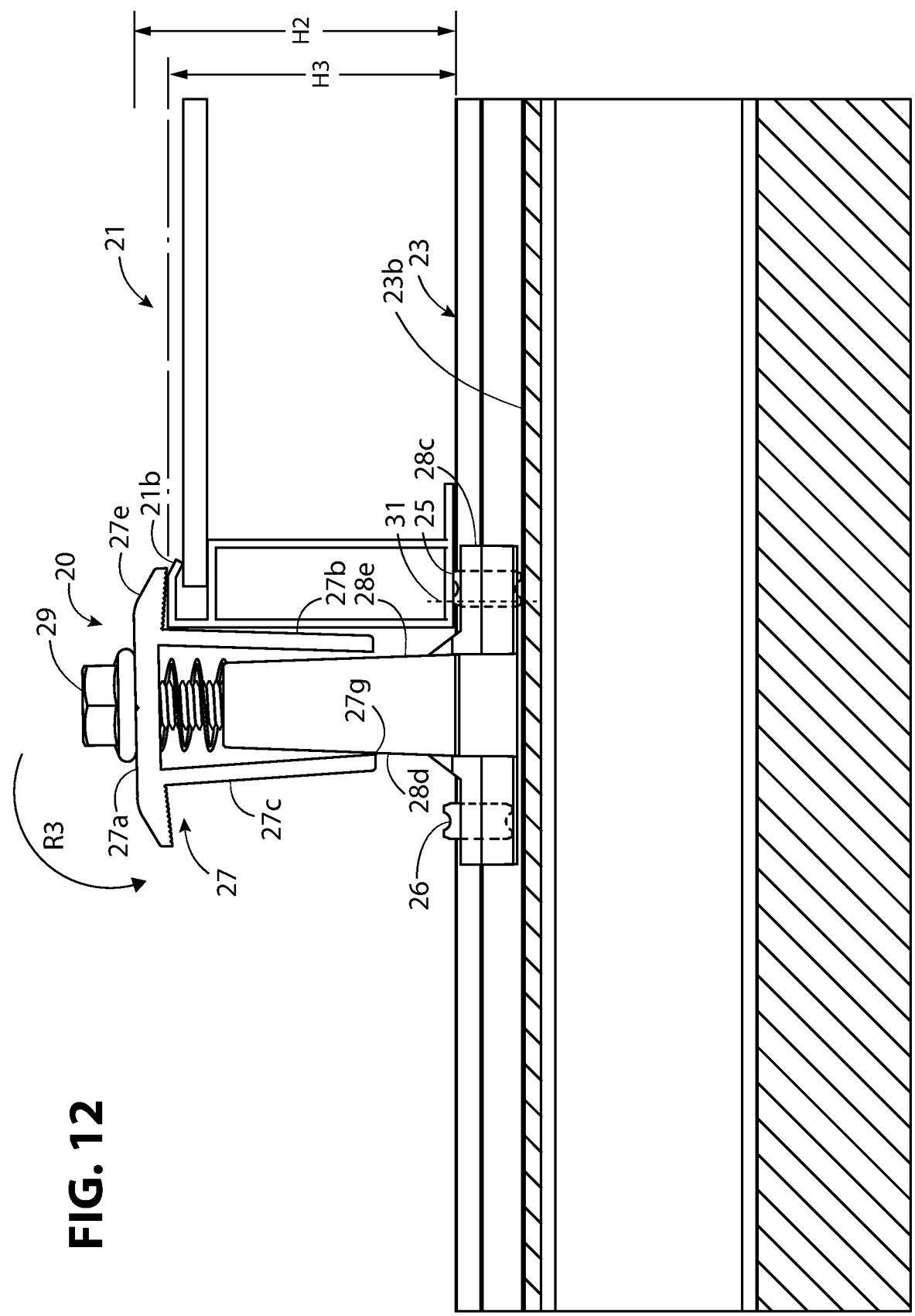
FIG. 12 illustrates a front elevation view as in FIG. 7, with the solar panel top clamp assembly tightened against the solar panel with a height lower than in FIG. 8.

Referring to FIG. 12, the combination of the oblique and inward facing angle of the first leg 27b and the second leg 27c, and the inward slope of the first pedestal face 28e and the second pedestal face 28d, help give the solar panel top clamp assembly 20 its functionality as a height-adjustable end-clamp. The height of the solar panel 21 is height H3 in FIG. 12. In order to illustrate the use of the solar panel top clamp assembly 20 with a thinner solar panel, height H3 is not as high as the height H2 of the solar panel 21 of FIG. 8. Height H2 is illustrated for comparison. As the threaded fastener 29 is tightened, the panel clamp 27 pivots or rotates about the point of contact between the first flange portion 27e of the crossbar 27a, and the top surface 21b of the solar panel 21. The second sharp vertex edge 27g of the second leg 27c engages the second pedestal face 28d as previously described. As previously described, the inward sloping of the first leg 27b helps make this possible. The inward sloping of the first leg 27b prevents it from rotating into the solar panel 21 regardless of the height of the solar panel 21. The inward slope of the first pedestal face 28e and the second pedestal face 28d help ensure that the sides forming the second sharp vertex edge 27g are not parallel to the second pedestal face 28d. This allows the second sharp vertex edge 27g to cut into the second pedestal face 28d and create a solid line of contact. In addition, the grounding pin 25 is pressed against the solar panel frame 21a and presses partially through the bottom of the platform 28c to engage the slot bottom surface 23b. This creates an electrical grounding path 31 between the solar panel 21, the support section 23, and the solar panel top clamp assembly 20. Grounding pin 26 remains in its resting position unengaged with the slot bottom surface 23b.

Referring to FIG. 6, the base 28 and the panel clamp 27 are both symmetrical in front view. Referring to FIGS. 7, 8, and 12, the solar panel top clamp assembly 20 can act as an end-clamp for a solar panel positioned on either side of the clamp with respect to the length of the support section 23. For example, in FIG. 3, the solar panel top clamp assembly 20 can function as an end-clamp for the solar panel 21 in absence of the solar panel 22. Likewise, the solar panel top clamp assembly 20 can function as an end-clamp for the solar panel 22 in absence of the solar panel 21. Referring to FIG. 10, the first leg 27b can include a first sharp vertex edge 27q located at a first end portion 27p. The first end portion 27p is distanced away from the crossbar 27a. The first sharp vertex edge 27q is formed by the intersection of the first inside face 27o and the first bottom surface 27r. The first sharp vertex edge 27q can be configured in a similar manner as previously described for the second sharp vertex edge 27g. The first sharp vertex edge 27q can interact with the first pedestal face 28e of FIG. 11 in a manner as described for the second sharp vertex edge 27g and the second pedestal face 28d as described in FIG. 9.

Figure 13:
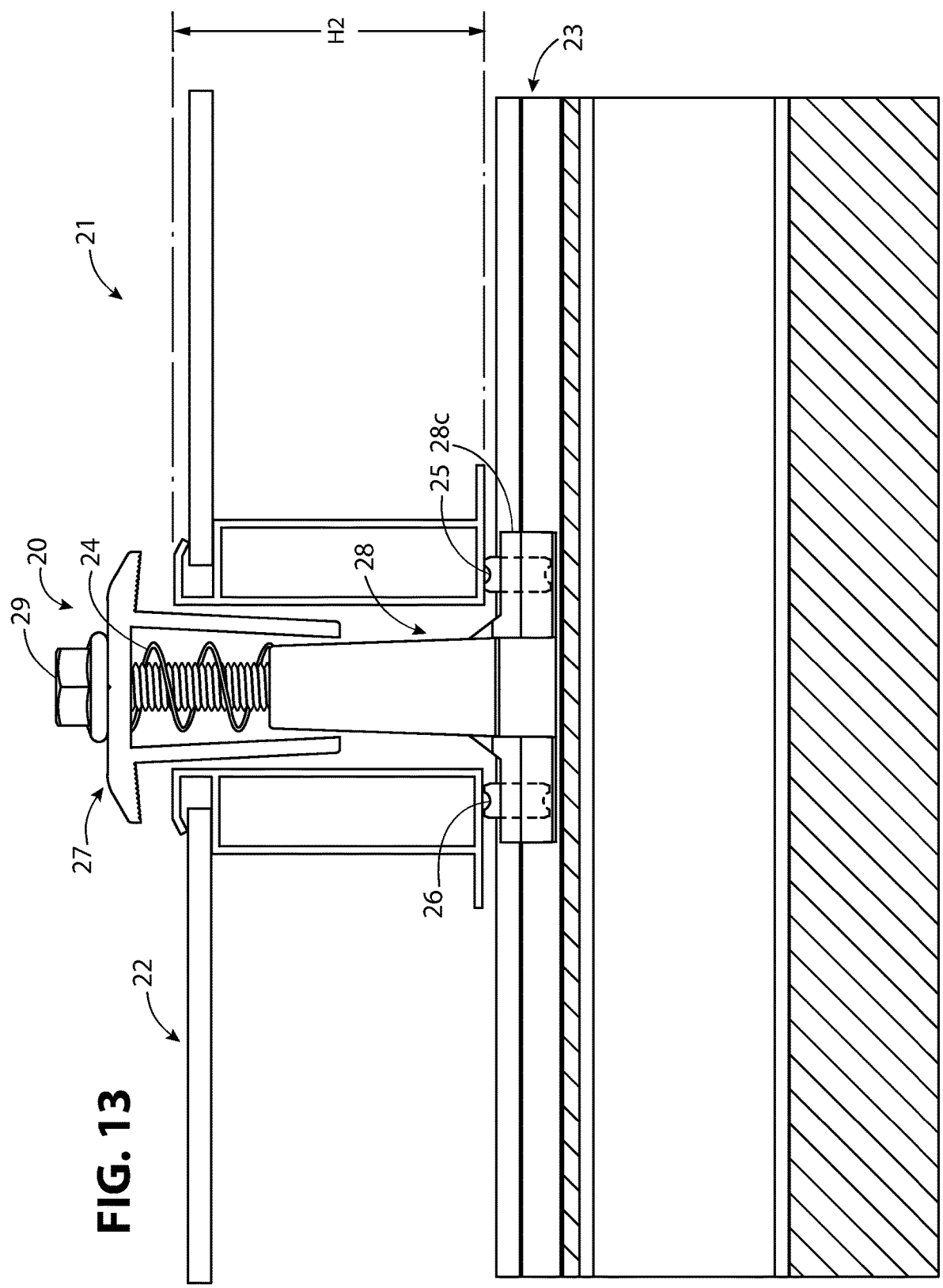
FIG. 13 illustrates a front elevation view of FIG. 3 with the support section cut away to show how the base interacts with the slot of the support section.
Figure 14:
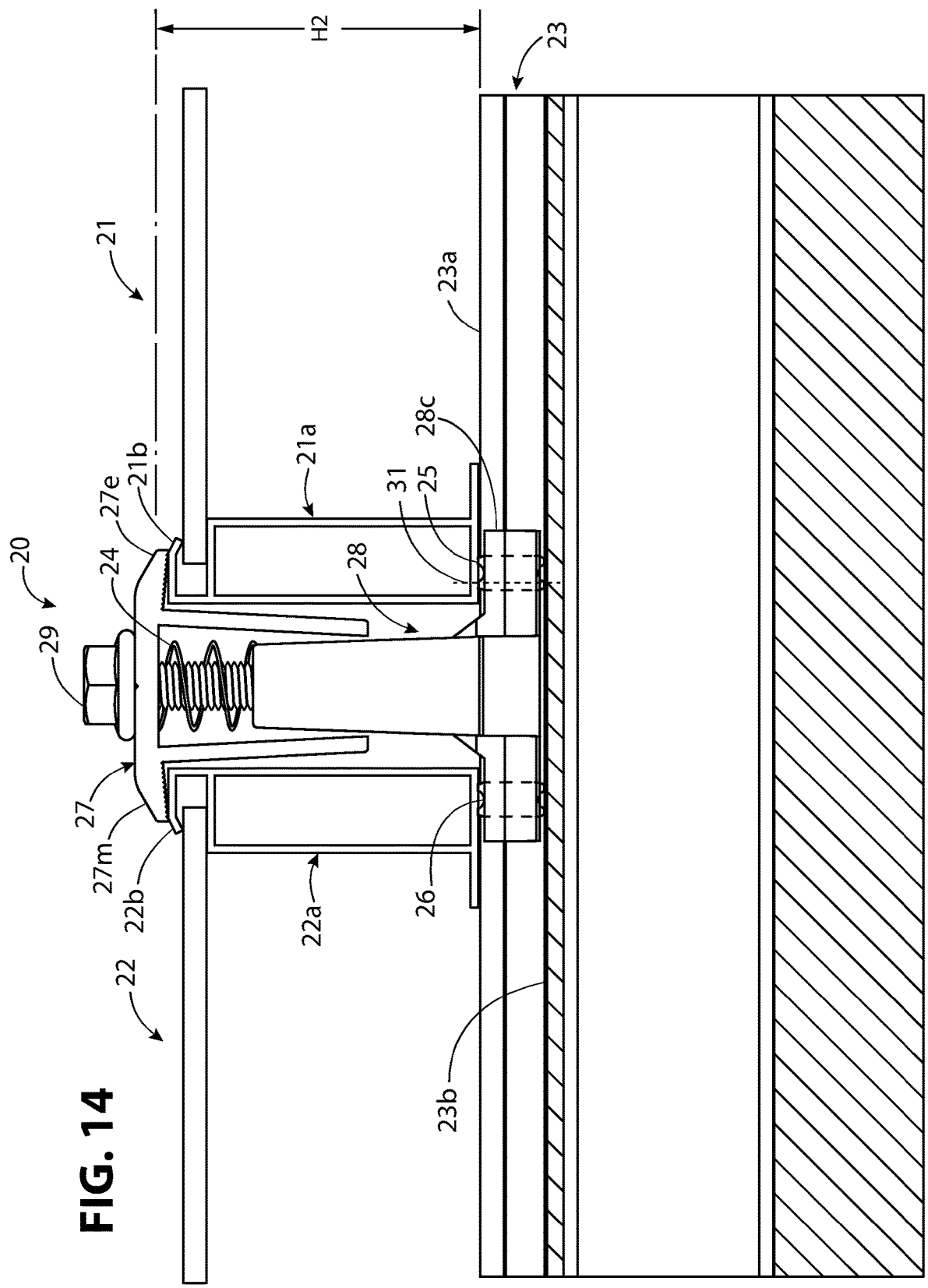
FIG. 14 illustrates a front elevation view as in FIG. 13, with the solar panel top clamp assembly tightened against the solar panel.
Figure 15:
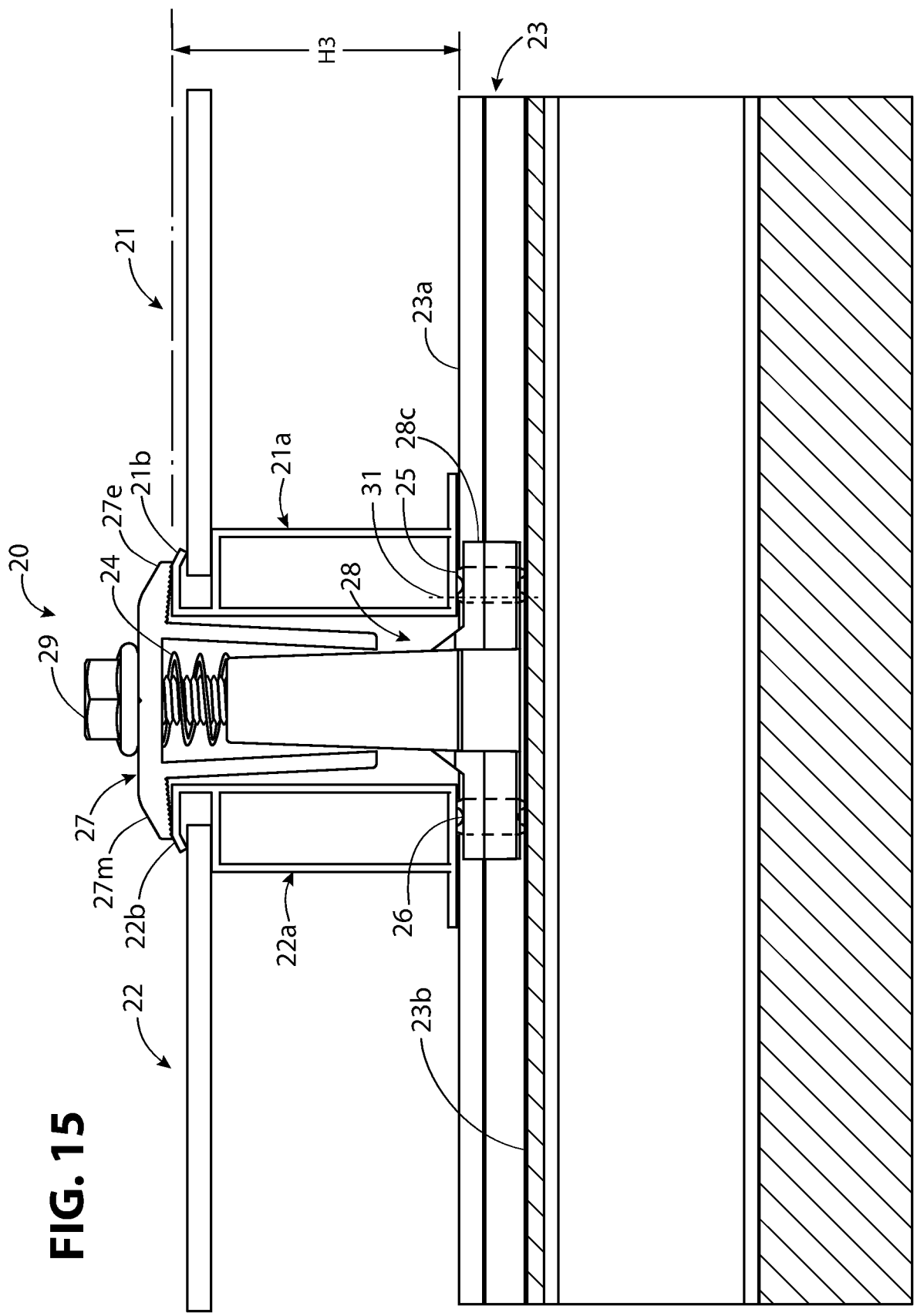
FIG. 15 illustrates a front elevation view as in FIG. 13, with the solar panel top clamp assembly tightened against the solar panel with a height lower than in FIG. 14.

FIGS. 13-15 illustrate how the solar panel top clamp assembly 20 can be used as a mid-clamp. FIGS. 13-15 show the solar panel 21, the solar panel 22, the support section 23, the spring 24, the grounding pins 25, 26, the panel clamp 27, base 28, and threaded fastener 29. In FIGS. 13 and 14 the solar panel 21 and the solar panel 22 have a height H2. In FIG. 15, the solar panel 21 and the solar panel 22 have a height H3. Referring to FIGS. 13 and 14, tightening the threaded fastener 29 in FIG. 13 causes in FIG. 14, the spring 24 to compress, the first flange portion 27e to engage the top surface 21b of the solar panel frame 21a, and the second flange portion 27m to engage the top surface 22b of the solar panel frame 22a. Referring to FIG. 15, the solar panel top clamp assembly 20 is illustrated accommodating thinner solar panels. Tightening the threaded fastener 29 causes the spring 24 to compress, the first flange portion 27e to engage the top surface 21b of the solar panel frame 21a, and the second flange portion 27m to engage the top surface 22b of the solar panel frame 22a. Referring to FIGS. 14 and 15, as the threaded fastener 29 is tightened the panel clamp 27, the tendency of the clamp to pivot, as previously described, is balanced because the panel clamp 27 equally engages the solar panel frames 21a, 22a. With the panel clamp 27 tightened against the solar panel frames 21a, 22a, the solar panel frames 21a, 22a press against the lengthwise top surface 23a of the support section 23, and press the grounding pins 25, 26 down through the platform 28c and against the slot bottom surface 23b. In FIG. 13, grounding pins 25, 26 are in a resting position partially extending above the top surface of the platform 28c. In FIGS. 14 and 15, grounding pins 25, 26 is pressed against the solar panel frame 21a, and presses partially through the bottom of the platform 28c to engage the slot bottom surface 23b. This creates an electrical grounding path 31 between the solar panel 21, the solar panel 22, the support section 23, and the solar panel top clamp assembly 20.

Figure 16:
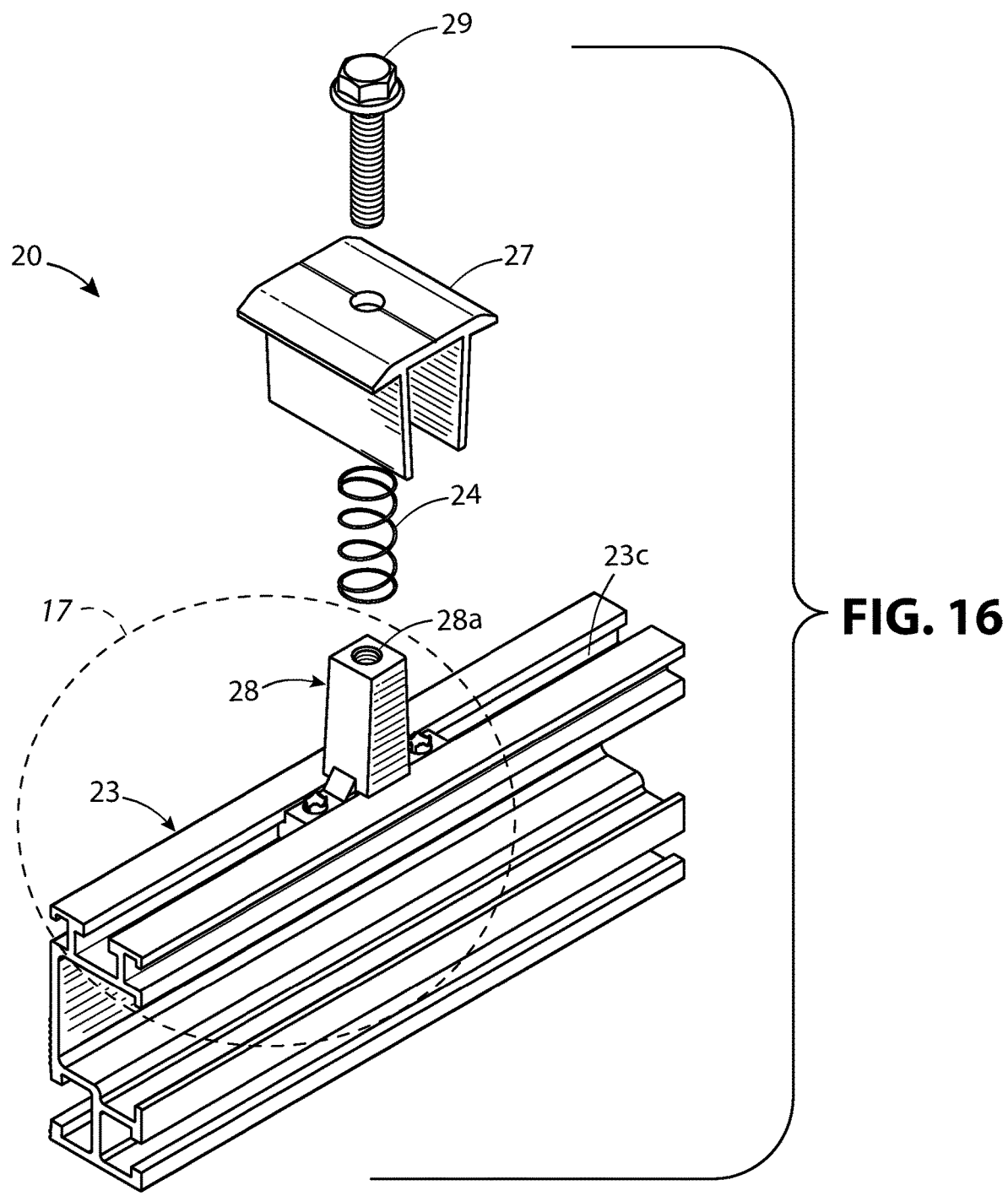
FIG. 16 illustrates a perspective view of the solar panel top clamp assembly with the panel clamp, threaded fastener, and spring exploded away to reveal the platform and support section.
Figure 17:
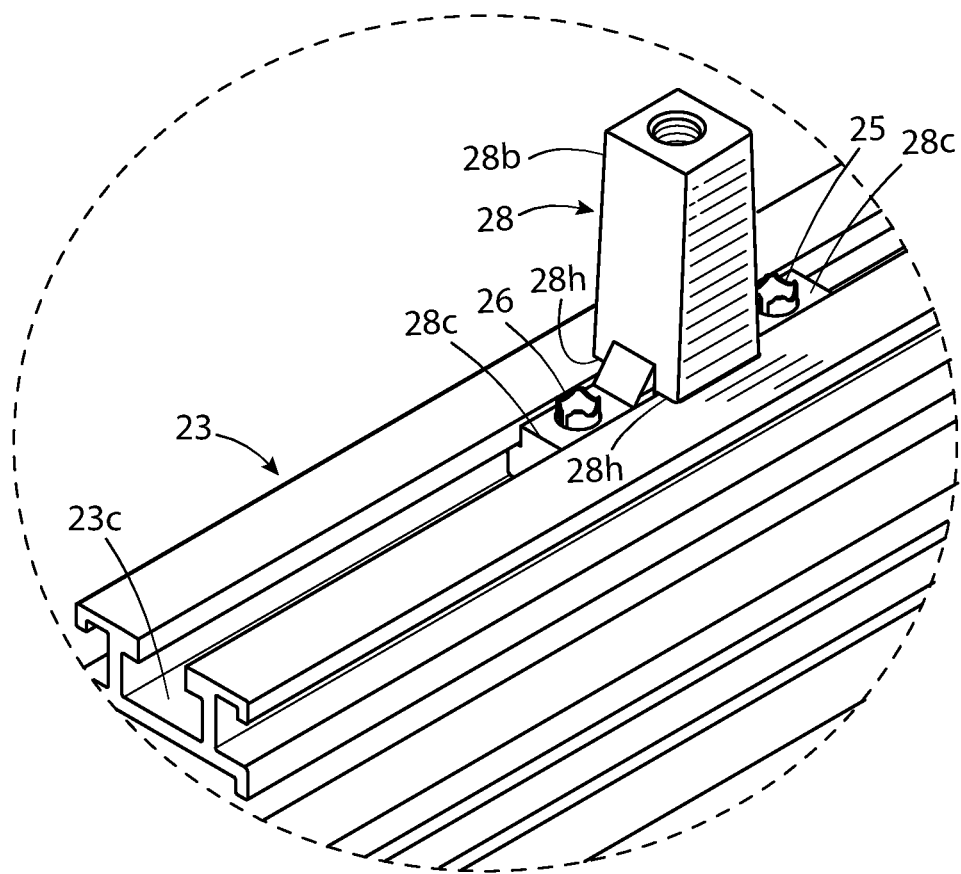
FIG. 17 illustrates a magnified view of a portion of the base and support section of FIG. 16 showing the interaction between the pedestal and the lengthwise top surface of the support section.
Figure 18:
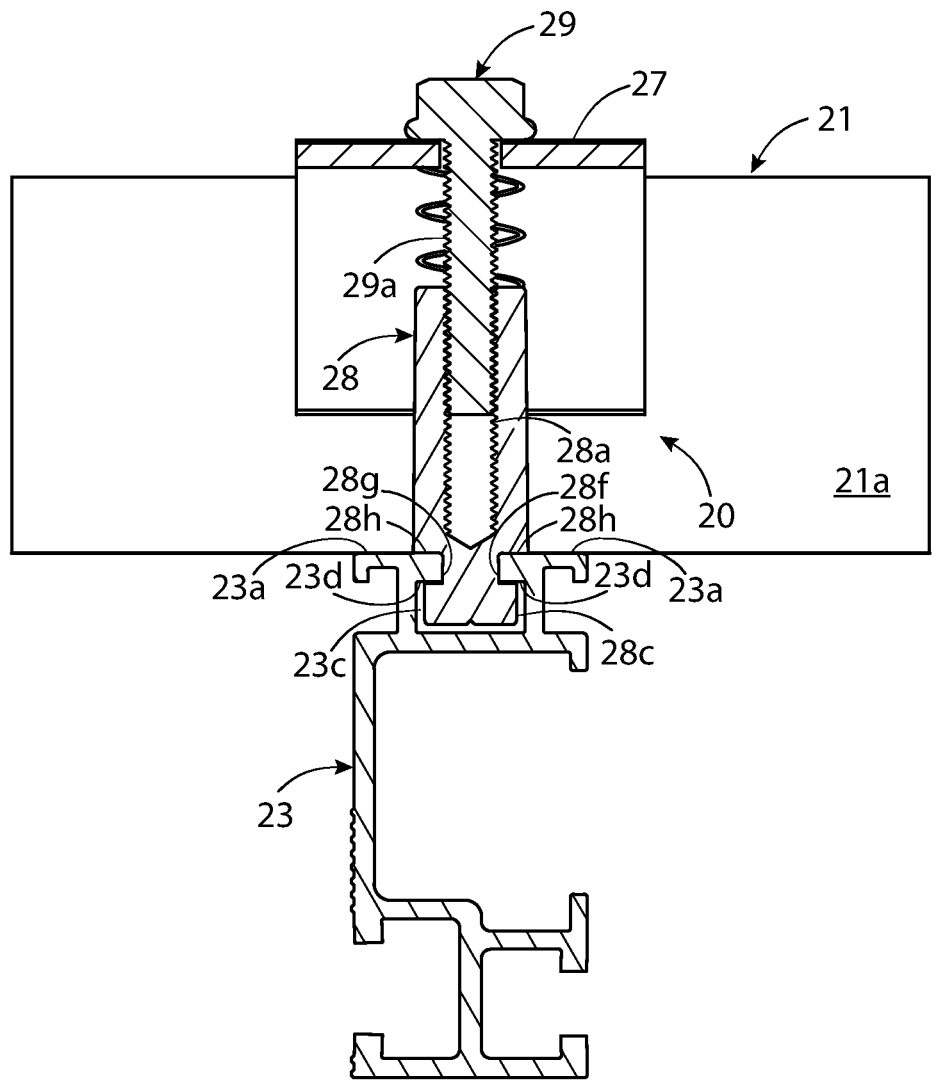
FIG. 18 illustrates a section view of FIG. 3 taken along section lines 18-18.

FIG. 16 illustrates the solar panel top clamp assembly 20 with the panel clamp 27, the threaded fastener 29, and the spring 24 exploded away to show how the base 28 is slidably captive within the slot 23c of the support section 23. FIG. 17 illustrates a magnified view of a portion of the base 28 and support section 23. FIG. 18 illustrates a section view of FIG. 1 taken along section lines 18-18. Both FIGS. 17 and 18 help illustrate in more detail the interaction between the base 28 and the support section 23. Referring to FIGS. 17 and 18, the platform 28c is sized and shaped to be captively slidable within the slot 23c along the lengthwise (i.e., the longitudinal axis) of the slot 23c. Referring to FIG. 18, as the threaded fastener body 29a of the threaded fastener 29 threadedly engages the threaded aperture 28a of the pedestal 28b and is tightened. As a consequence, the solar panel frame 21a of the solar panel 21 presses against the lengthwise top surface 23a of the support section 23, the panel clamp 27 presses against the solar panel frame 21a, and the platform 28c presses against the top inside surface 23d of the slot 23c. As the platform 28c presses against the top inside surface 23d of the slot 23c, it stabilizes the base 28 and helps it remain rigid with respect to the support section 23, solar panel 21, and threaded fastener 29.

Referring to FIG. 17, the platform 28c extends lengthwise (i.e., longitudinally) in both directions along the slot 23c away from the pedestal 28b. Referring to FIGS. 17 and 18, a pedestal bottom surface 28h extends across (i.e. transversely) the lengthwise top surfaces 23a of the support section 23 on both sides of the slot 23c. This combination of the platform 28c lengthwise extension and transverse extension of the bottom of the pedestal 28b add further stability to the base 28. Referring to FIG. 17, in addition, the lengthwise extension of the platform 28c allows for the use of the grounding pins 25, 26. Referring to FIGS. 5, 6, and 18, a first indent 28f and a second indent 28g (FIG. 18), can be approximately the thickness of the support section 23 at the opening of the slot 23c. Referring to FIG. 18, the first indent 28f and the second indent 28g are positioned between the pedestal bottom surface 28h and the platform 28c. This further adds stability to the base 28.

A solar panel top clamp assembly 20 has been described. It is not the intent of this disclosure to limit the claimed invention to the examples, variations, and exemplary embodiments described in the Specification. Those of ordinary skill in the art will recognize that variations will occur when embodying the claimed invention in specific implementations and environments. For example, in FIGS. 3, 4, 7, 8, 12-16, and 18, the solar panel top clamp assembly 20 can be secured to a support section 23. The support section 23 is typically a rail. The support section 23 can also be a so-called "rail-less" mounting device. Some rail-less mounting devices can have similar construction to a rail. The difference between a rail and a rail-less mounting device, in this case being the rail, spans across the entire length or width of one or more solar panels. A rail-less device does not span the entire length or width of one or more solar panels. Typically, one rail-less device would be placed under each open corner of the solar panel and at the shared junctions with other solar panels. For example, at the shared junction between the solar panel 21 and the solar panel 22 in FIG. 3. In FIGS. 3, 4, 7, 8, and 12-18, the support section 23 shown can represent only a portion of the entire support section, particularly, if the support section 23 were a rail. This is for illustrative purposes and for the convenience of the reader.

FIGS. 3, 4, 7, 8, and 12-18, the support section 23, as illustrated, can be readily mounted to a roof. The roof 30 is shown in FIGS. 3 and 4. This is one possible mounting environment. Generally speaking, the structure of the solar panel top clamp assembly 20 does not depend on what mounting structure the support section 23 is secured to. It is the inventors' intent that the inventive concept not be limited to a roof or any particular mounting environment. The inventor envisions that the mounting rail can be also mounted to many other mounting environments, for example, the support section 23 can attach to ground-mounted solar panel structures as well as other surfaces not necessarily associated with roofs. For example, the mounting rail can be mounted to a ground-mounted fixed or tracking solar panel structure via clamping devices such as u-shaped clamps. Any reference to a roof or roofs in the preamble of the claims, for example, "A solar panel top clamp assembly for attaching a solar panel to a roof . . . ," is meant as a statement of intended use. This is not meant to limit the claimed structure to being mounted to a roof.

A threaded fastener 29 is discussed for FIGS. 5-8 and 12-16, and 18. Typically, the threaded fastener 29 can be a bolt or a screw. The threaded fastener 29 can be any threaded fastener with the capacity to threadedly attach to threaded aperture 28a (FIGS. 5, 6, 16, and 18) in the pedestal 28b (FIGS. 5, 6, 8, and 12) with sufficient holding force to clamp the panel clamp 27 against the solar panel frame 21a (FIGS. 8, 12, 14, 15) and solar panel frame 22a (FIGS. 14 and 15) under normal operating conditions.

The claims are not to be interpreted as including means-plus-function limitations unless a claim explicitly evokes the means-plus-function clause of 35 U.S.C. § 112(f) by using the phrase "means for" followed by a verb in gerund form.

"Optional" or "optionally" is used throughout this disclosure to describe features or structures that are optional. Not using the word optional or optionally to describe a feature or structure does not imply that the feature or structure is essential, necessary, or not optional. Discussing advantages of one feature over another, or one implementation or another conceived by the inventor, does not imply that the feature or implementation is essential. Using the word "or," as used in this disclosure is to be interpreted as the Boolean meaning of the word "or" (i.e., an inclusive or) For example, the phrase "A or B" can mean: A without B, B without A, A with B. For example, if one were to say, "I will wear a waterproof jacket if it snows or rains," the meaning is that the person saying the phrase intends to wear a waterproof jacket if it rains alone, if it snows alone, if it rains and snows in combination.

While the examples, exemplary embodiments, and variations are helpful to a person of ordinary skill in the art in understanding the claimed invention, it should be understood that the scope of the claimed invention is defined solely by the following claims and their equivalents.

What is claimed is:

1. A solar panel top clamp assembly for attaching a solar panel to a roof and to a support section, the support section including a slot extending longitudinally along a lengthwise top surface of the support section, comprising:
   a panel clamp including a crossbar forming a top portion of the panel clamp, a first leg and a second leg each extending obliquely downward from the crossbar and inward toward each other;
   a base including a platform sized and shaped to slide captively within the slot, and a pedestal positioned outside the slot and extending upward from the platform;
   the pedestal includes a first pedestal face facing the first leg and a second pedestal face facing the second leg, the first pedestal face and the second pedestal face each extending obliquely upward from the platform and inward toward each other; and
   a threaded fastener extending through the crossbar and threadedly engaging the pedestal causes the crossbar to engage the solar panel and clamp the solar panel against the support section.

2. The solar panel top clamp assembly of claim 1, wherein:
   the platform extends lengthwise along the slot away from the first pedestal face and along the slot away from the second pedestal face.

3. The solar panel top clamp assembly of claim 2, wherein:
   the platform includes a grounding pin extending therethrough;
   the grounding pin is positioned engage the solar panel and the slot and form an electrical grounding path therewith.

4. The solar panel top clamp assembly of claim 2, wherein:
   the pedestal includes a pedestal bottom surface that extend transversely over lengthwise top surfaces of the support section on both sides of the slot.

5. The solar panel top clamp assembly of claim 1, wherein:
   the second leg includes a second end portion located distally from the crossbar and a second sharp vertex edge on the second end portion; and
   the solar panel top clamp assembly, being configured as an end-clamp, the threaded fastener being tightened causes the panel clamp to pivots away from the solar panel about contact point between the crossbar and the solar panel and causes the second sharp vertex edge to pivot against the second pedestal face.

6. A solar panel top clamp assembly for attaching a solar panel to a roof and to a support section, the support section including a slot extending longitudinally along a lengthwise top surface of the support section, comprising:
   a panel clamp including a crossbar forming a top portion of the panel clamp, a first leg and a second leg each extending obliquely downward from the crossbar and inward toward each other;
   a base including a platform sized and shaped to slide captively within the slot, and a pedestal positioned outside the slot and extending upward from the platform, the pedestal includes a first pedestal face facing the first leg and a second pedestal face facing the second leg, the platform extends lengthwise along the slot away from the first pedestal face and along the slot away from the second pedestal face, the platform includes a grounding pin extending therethrough, the grounding pin is positioned to engage the solar panel and the slot and form an electrical grounding path therewith; and a threaded fastener extending through the crossbar and threadedly engaging the pedestal causes the crossbar to engage the solar panel and clamp the solar panel against the support section.

7. The solar panel top clamp assembly of claim 2, wherein:

the second leg includes a second end portion located distally from the crossbar and a second sharp vertex edge on the second end portion; and the solar panel top clamp assembly, being configured as an end-clamp, the threaded fastener being tightened causes the panel clamp to pivots away from the solar panel about contact point between the crossbar and the solar panel and causes the second sharp vertex edge to pivot against the second pedestal face.

8. The solar panel top clamp assembly of claim 2, wherein:

the pedestal includes a pedestal bottom surface that extend transversely over lengthwise top surfaces of the support section on both sides of the slot.

9. The solar panel top clamp assembly of claim 8, wherein:

the base includes a first indent and a second indent positioned between the pedestal bottom surface and the base.

10. The solar panel top clamp assembly of claim 1, wherein:

the pedestal includes a pedestal bottom surface that extend transversely over lengthwise top surfaces of the support section on both sides of the slot.

11. The solar panel top clamp assembly of claim 10, wherein:

the base includes a first indent and a second indent positioned between the pedestal bottom surface and the base.

12. A solar panel top clamp assembly for attaching a solar panel to a roof and to a support section, the support section including a slot extending longitudinally along a lengthwise top surface of the support section, comprising:

a panel clamp including a crossbar forming a top portion of the panel clamp, a first leg and a second leg each extending obliquely downward from the crossbar and inward toward each other;

a base including a platform sized and shaped to slide captively within the slot, and a pedestal positioned outside the slot and extending upward from the platform;

a threaded fastener extending through the crossbar and threadedly engaging the pedestal causes the crossbar to engage the solar panel and clamp the solar panel against the support section;

the second leg includes a second end portion located distally from the crossbar and a second sharp vertex edge on the second end portion; and the solar panel top clamp assembly, being configured as an end-clamp, the threaded fastener being tightened causes the panel clamp to pivots away from the solar panel about contact point between the crossbar and the solar panel and causes the second sharp vertex edge to pivot against the pedestal.

13. The solar panel top clamp assembly of claim 1, wherein:

the base includes a first indent and a second indent positioned between the pedestal and the base.

\* \* \* \* \*